US012681282B2

(12) United States Patent
Gao

(10) Patent No.: US 12,681,282 B2
(45) Date of Patent: Jul. 14, 2026

(54) TILING LIGHT SHEET SELECTIVE PLANAR ILLUMINATION MICROSCOPE, USE METHOD THEREOF AND MICROSCOPE SYSTEM

(71) Applicant: WESTLAKE UNIVERSITY, Hangzhou (CN)

(72) Inventor: Liang Gao, Hangzhou (CN)

(73) Assignee: WESTLAKE UNIVERSITY, Hangzhou (CN)

( * ) Notice: Subject to any disclaimer, the term of this patent is extended or adjusted under 35 U.S.C. 154(b) by 769 days.

(21) Appl. No.: 17/772,688

(22) PCT Filed: Apr. 10, 2020

(86) PCT No.: PCT/CN2020/084130
§ 371 (c)(1),
(2) Date: Apr. 28, 2022

(87) PCT Pub. No.: WO2021/082355
PCT Pub. Date: May 6, 2021

(65) Prior Publication Data
US 2023/0194843 A1 Jun. 22, 2023

Related U.S. Application Data

(60) Provisional application No. 62/926,888, filed on Oct. 28, 2019.

(51) Int. Cl.
*G02B 21/00* (2006.01)
*G02B 21/06* (2006.01)
*G02B 21/36* (2006.01)
(52) U.S. Cl.
CPC ..... *G02B 21/0032* (2013.01); *G02B 21/0036* (2013.01); *G02B 21/06* (2013.01); *G02B 21/367* (2013.01)

(58) Field of Classification Search
CPC G02B 21/0032; G02B 21/0036; G02B 21/06; G02B 21/367; G02B 27/58; G02B 21/006; G02B 21/362; G02B 21/0076
(Continued)

(56) References Cited

U.S. PATENT DOCUMENTS

| | | | |
|---|---|---|---|
| 2014/0125860 A1* | 5/2014 | Tofsted | H04N 23/75 348/349 |
| 2018/0045941 A1* | 2/2018 | Gao | G01N 15/1456 |
| 2019/0250391 A1* | 8/2019 | Gao | G02B 21/006 |

FOREIGN PATENT DOCUMENTS

| | | | | |
|---|---|---|---|---|
| CN | 104428706 A | * | 3/2015 | G02B 21/0032 |
| CN | 103562763 B | * | 11/2016 | H04J 14/052 |

(Continued)

OTHER PUBLICATIONS

Extended European Search Report issued in corresponding EP Patent Application No. 20880848.5, dated Dec. 5, 2022, pp. 1-13.
(Continued)

*Primary Examiner* — William R Alexander
*Assistant Examiner* — Alaina Marie Swanson
(74) *Attorney, Agent, or Firm* — Carter, DeLuca & Farrell LLP

(57) ABSTRACT
Provided are a tiling light sheet selective plane illumination microscope (TLS-SPIM), a use method thereof and a microscope system. The use method includes loading a corresponding phase map to each group of pupil subsections of a pupil by a spatial light modulator, and performing phase modulation on an excitation beam to create at least two coaxial excitation beam arrays; scanning the created at least two coaxial excitation beam arrays to generate discontinuous light sheets accordingly; and tiling at least one of the generated discontinuous light sheets in the propagation direction of the excitation light to obtain tiling light sheets for selective plane illumination of a sample. The method of
(Continued)

using the TLS-SPIM, the TLS-SPIM and the system includ-ing same enables significant increasing of imaging speed, improvement of resolution, and reduction of source data amount.

19 Claims, 10 Drawing Sheets

(58) Field of Classification Search
USPC .......................................................... 359/385
See application file for complete search history.

(56) References Cited

FOREIGN PATENT DOCUMENTS

| | | | |
|---|---|---|---|
| WO | 2007124437 | A2 | 11/2007 |
| WO | 2013053454 | A1 | 4/2013 |

OTHER PUBLICATIONS

Wang, D. et al., "Tiling light sheet selective plane illumination microscopy using discontinuous light sheets" Optics Express (Nov. 2019) pp. 34472-34483, vol. 27, No. 23.

Fu, Q. et al., "Imaging multicellular specimens with real-time optimized tiling light-sheet selective plane illumination micros-copy" Nature Communications (Mar. 2016) pp. 1-10, vol. 7, No. 1.

International Search Report issued in corresponding International Application No. PCT/CN2020/084130 dated Jul. 24, 2020, pp. 1-2, English Translation.

* cited by examiner

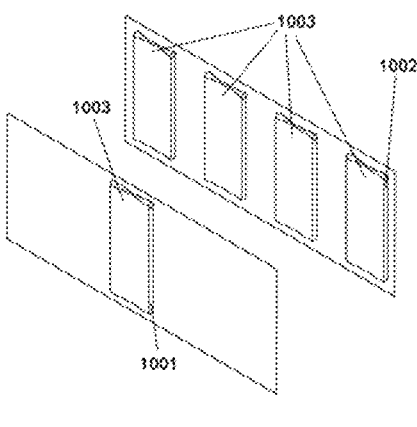
FIG 1(a)
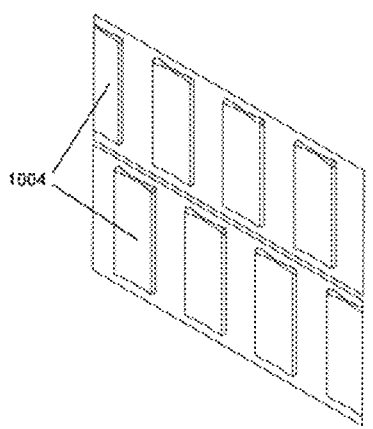
FIG 1(b)
FIG 1(c)

101

Loading a corresponding phase map to each group of pupil subsections of a pupil by means of a spatial light modulator (SLM), and performing phase modulation on an excitation beam to create at least two coaxial excitation beam arrays

102

Scanning the created at least two coaxial excitation beam arrays to generate discontinuous light sheets accordingly

103

Tiling at least one of the generated discontinuous light sheets in the propagation direction of the excitation light to obtain tiling light sheets for selective plane illumination of a sample

FIG 1(d)

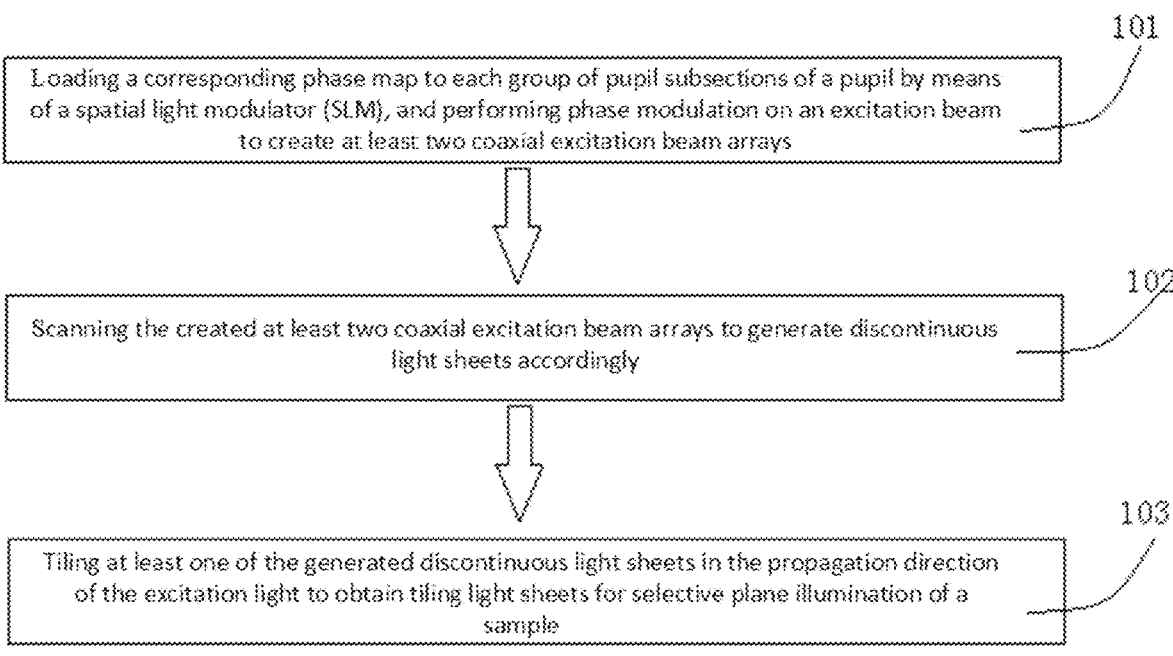

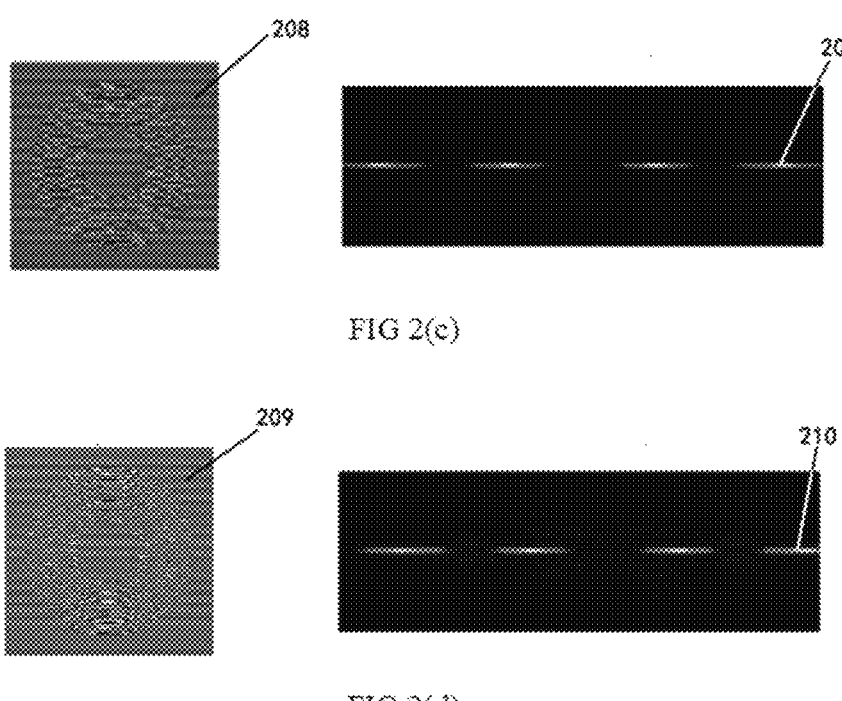
FIG 2(c)
FIG 2(d)
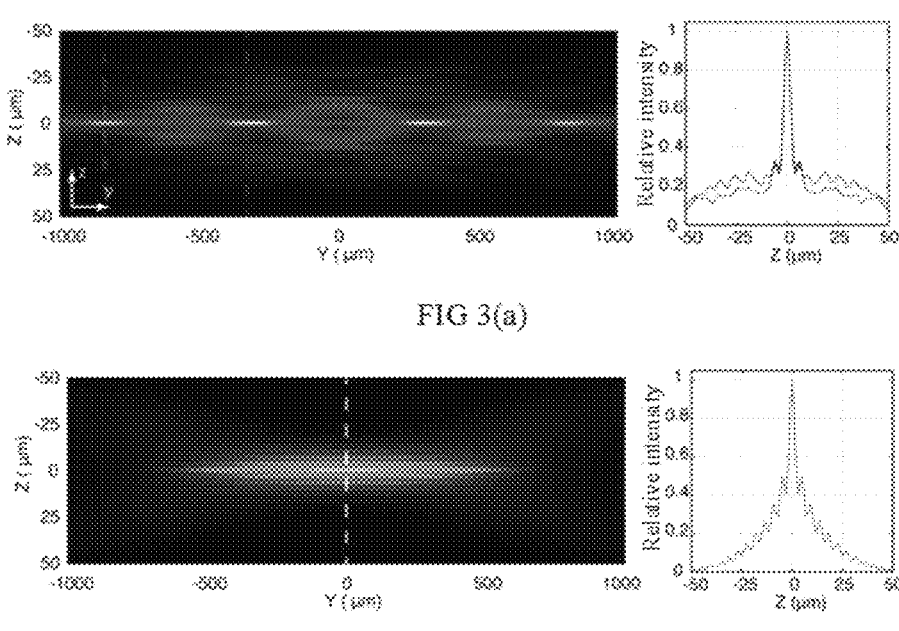
FIG 3(a)
FIG 3(b)

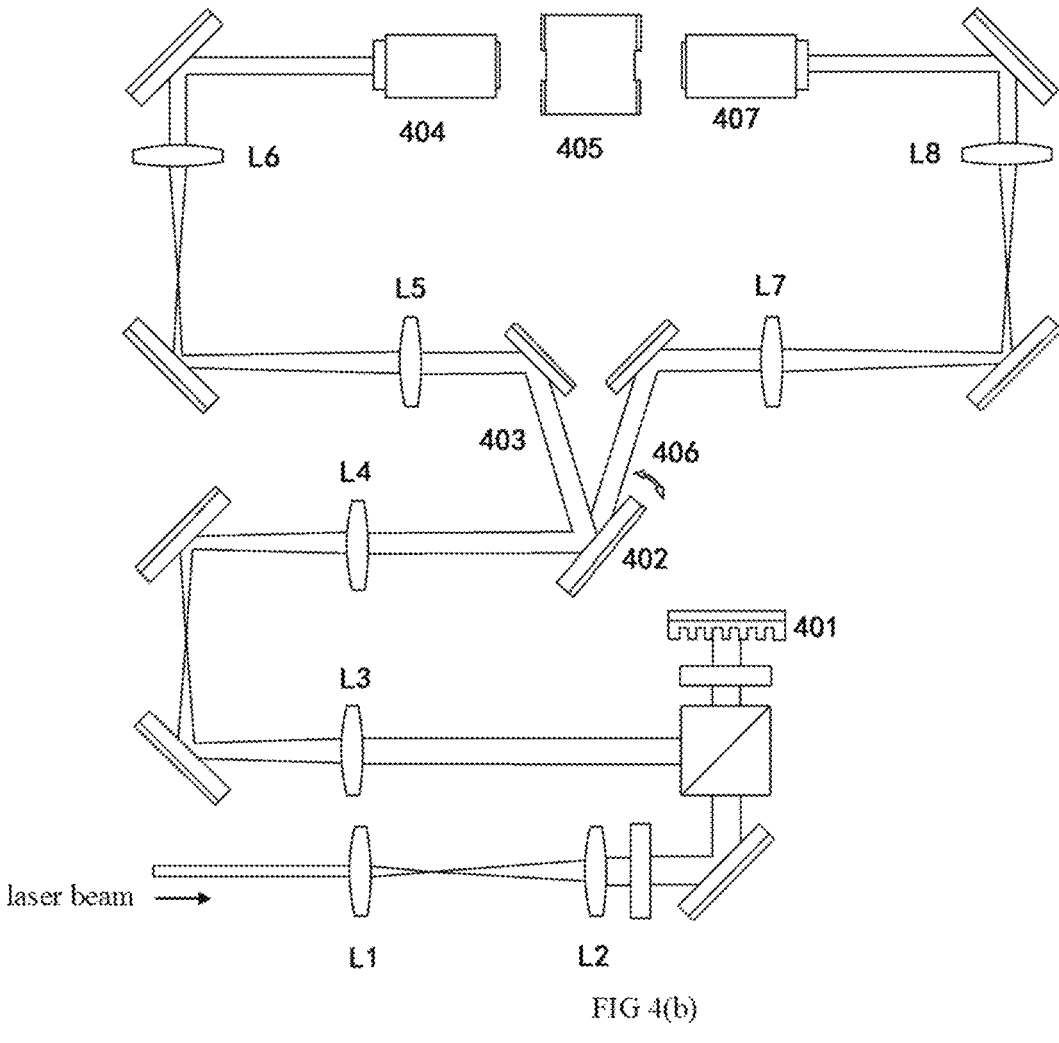
L6 404 405 407 L8
L5 L7
403 406
L4 402
401
L3
laser beam →
L1 L2
FIG 4(b)
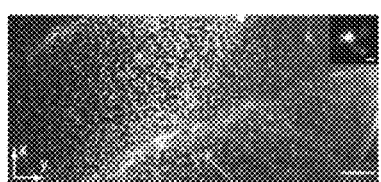
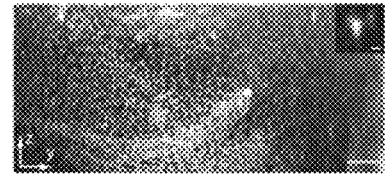
FIG 5(a) FIG 5(b)

TILING LIGHT SHEET SELECTIVE PLANAR ILLUMINATION MICROSCOPE, USE METHOD THEREOF AND MICROSCOPE SYSTEM

CROSS REFERENCE TO RELATED APPLICATIONS

The present application is a national stage application of International Application No. PCT/CN2020/084130, filed Apr. 10, 2020, which claims the benefit of and priority to U.S. Patent Application No. 62/926,888, filed Oct. 28, 2019, the entire contents of each of which are hereby incorporated by reference herein in their entirety.

TECHNICAL FIELD

The present disclosure relates to a precision optical instrument, a use method thereof and a system including same, and in particular to a tiling light sheet selective plane illumination microscopy, a use method thereof and a tiling light sheet selective plane illumination microscopy system.

BACKGROUND

The 3D imaging ability of a selective plane illumination microscopy (SPIM) (also referred to as a light sheet microscopy) relies on the intensity distribution of an excitation light sheet used for 3D imaging. The thickness, light confinement ability, and size of the light sheet determine the axial resolution, optical sectioning ability, and field of view (FOV) of the SPIM respectively. Due to the diffraction of light, however, as the length of the light sheet increases, the confinement of the excitation light decreases, which makes it impossible to optimize the thickness, light confinement ability and size of the light sheet at the same time. Therefore, it is challenging to image large samples at high spatial resolution and signal to noise ratio (SNR) using the SPIM.

In order to maintain high spatial resolution and good optical sectioning ability in a FOV much larger than the size of the light sheet, an effective approach is to quickly move the light sheet in the imaging plane along the propagation direction of the excitation light, in addition to the approaches of optimizing the intensity distribution of the light sheet. The tiling light sheet selective plane illumination microscopy (TLS-SPIM) uses this strategy and real time optimized tiling light sheets to improve the 3D imaging ability of SPIM on large samples.

In the TLS-SPIM, a large field of view (FOV) is imaged by tiling a short and thin light sheet at multiple positions in the imaging plane and taking an image at each light sheet tiling position. The original images acquired at all the tiling positions are used to reconstruct a final image. Although the TLS-SPIM improves 3D imaging ability, the tiling process and additional camera exposures slow down the imaging speed and increase the number of source images. Specifically, the imaging speed decreases in proportion to the number of tiles and the amount of original image data increases in proportion to the number of tiles, wherein the number of tiles is the number of camera exposures required for each imaging plane. Although these problems are less of an issue when the number of tiles and the size of the sample are small, they become serious when the TLS-SPIM is used to image large samples at high spatial resolution (which requires a large number of tiles for each imaging plane). For example, when the TLS-SPIM is used to image optically transparent biological tissues at micron-level spatial resolution, although the spatial resolution is improved, the total imaging time is extended by several hours or more compared with the non-tiling case. At the same time, hundreds of thousands of megabytes or more of additional raw image data are generated through the additional camera exposures, which must be collected and processed. This creates a heavy burden on the limited bandwidth of most imaging systems for acquiring and analyzing data.

At present, in order to image a larger effective region, for each tile, it is a common practice to try to extend, along the propagation direction of the excitation light, the excitation light sheet, such as a Bessel light sheet and a lattice light sheet, obtained by scanning a "non-diffracting" beam or beam array. When the size of the light sheet increases, especially during the imaging of large-volume samples, however, the confinement ability of the excitation beam of this "non-diffracting" light sheet decreases rapidly, which significantly reduces the optical sectioning ability and spatial resolution.

The present disclosure is provided to solve the above-mentioned defects in the background.

SUMMARY

Therefore, there is a need for a use method of a TLS-SPIM, a new TLS-SPIM and a system including same, which can significantly increase the imaging speed, improve the resolution, and reduce the amount of source data compared with an ordinary TLS-SPIM.

According to a first aspect of the present disclosure, a use method of a tiling light sheet selective plane illumination microscopy is provided. The use method comprises: loading a corresponding phase map to each group of pupil subsections of a pupil by means of a spatial light modulator (SLM), and performing phase modulation on an excitation beam to create at least two coaxial excitation beam arrays. The created at least two coaxial excitation beam arrays can be scanned to generate discontinuous light sheets accordingly. At least one of the generated discontinuous light sheets can be tiled in the propagation direction of the excitation light to obtain tiling light sheets for selective plane illumination of a sample.

According to a second aspect of the present disclosure, a tiling light sheet selective plane illumination microscopy is provided. The tiling light sheet selective plane illumination microscopy comprises a spatial light modulator (SLM) for performing phase modulation on an excitation beam, a galvanometer, an illumination path, and an excitation objective at an end of the illumination path, wherein an optical modulation plane of the SLM is conjugated to the entrance pupil of the excitation objective. The SLM can be configured to: load a combined phase map obtained by simulation in advance to implement loading of a corresponding phase map to each group of pupil subsections of the pupil, so as to create multiple coaxial excitation beam arrays. The galvanometer can be configured to: scan at least one of the created coaxial excitation beam arrays to generate at least one discontinuous light sheet accordingly. The SLM can be further configured to: load a combined phase map superimposed with a spherical phase, so as to implement the creation of the coaxial excitation beam arrays together with tiling of the discontinuous light sheets in the propagation direction of the excitation light.

According to a third aspect of the present disclosure, a tiling light sheet selective plane illumination microscopy system is provided. The microscopy system can comprise the tiling light sheet selective plane illumination microscopy according to various embodiments of the present disclosure. The microscopy system can further comprise a processing unit, and the processing unit can be configured to: perform simulation at first to obtain the combined phase map, the loading of which to the SLM implements the loading of the corresponding phase map to each group of pupil subsections of the pupil, so as to create the multiple coaxial excitation beam arrays; and superimpose the spherical phase on the combined phase map according to a need for tiling of the at least one generated discontinuous light sheet.

With the use method of TLS-SPIM, the TLS-SPIM and the system including the same according to the present disclosure, the present disclosure can significantly increase the imaging speed, improve the spatial resolution, and reduce the amount of source data.

BRIEF DESCRIPTION OF THE DRAWINGS

In figures that are not necessarily drawn to scale, the same reference numerals may describe similar components in different figures. The same reference signs with suffixes or different suffixes may denote different examples of similar components. The figures generally show various embodiments by way of example rather than limitation, and are used together with the description and the claims to describe the embodiments of the present disclosure. Such embodiments are illustrative, and are not intended to be exhaustive or exclusive embodiments of the present device or method.

FIG. 1(a) shows a schematic diagram of 3D imaging using a discontinuous light sheet in a TLS-SPIM according to an embodiment of the present disclosure;

FIG. 1(b) shows a diagram of a first example of a method of using a discontinuous light sheet in a TLS-SPIM according to an embodiment of the present disclosure;

FIG. 1(c) shows a diagram of a second example of the method of using the discontinuous light sheet in the TLS-SPIM according to an embodiment of the present disclosure;

FIG. 1(d) shows a flowchart of a use method of a TLS-SPIM according to an embodiment of the present disclosure;

FIG. 2(a) shows a diagram of a first group of pupil subsections and a first phase map for generating a first pair of coaxial excitation beams (also collectively referred to as a first coaxial excitation beam array), and the first pair of coaxial excitation beams according to an embodiment of the present disclosure;

FIG. 2(b) shows a diagram of a second group of pupil subsections and a second phase map for generating a second pair of coaxial excitation beams (also collectively referred to as a second coaxial excitation beam array), and the second pair of coaxial excitation beams according to an embodiment of the present disclosure;

FIG. 2(c) shows a diagram of a combined phase map for generating a coaxial excitation beam array including a first pair and a second pair of coaxial excitation beams, and the coaxial excitation beam array according to an embodiment of the present disclosure;

FIG. 2(d) shows a diagram of a tiling phase map for tiling the coaxial excitation beam array shown in FIG. 2(c) and the tiled coaxial excitation beam array according to an embodiment of the present disclosure;

FIG. 3(a) shows the maximum intensity projection in the YZ plane of a discontinuous light sheet created by scanning the coaxial excitation beam array shown in FIG. 2(c), and its intensity distribution at a designated position according to an embodiment of the present disclosure;

FIG. 3(b) shows the maximum intensity projection in the YZ plane of a Bessel light sheet with a thickness and effective length equivalent to those of the discontinuous light sheet shown in FIG. 3(a) and its intensity distribution at a designated position;

FIG. 4(b) shows a schematic structural diagram of an example of a TLS-SPIM according to an embodiment of the present disclosure;

FIGS. 5(a) and 5(b) respectively show the maximum intensity projections in the XY plane and the YZ plane of a volume sample imaged using a continuous light sheet created by scanning an excitation beam;

5

Figures 6A, 6B, 6C, 6D, 6E, 6F, 6G, 6H:
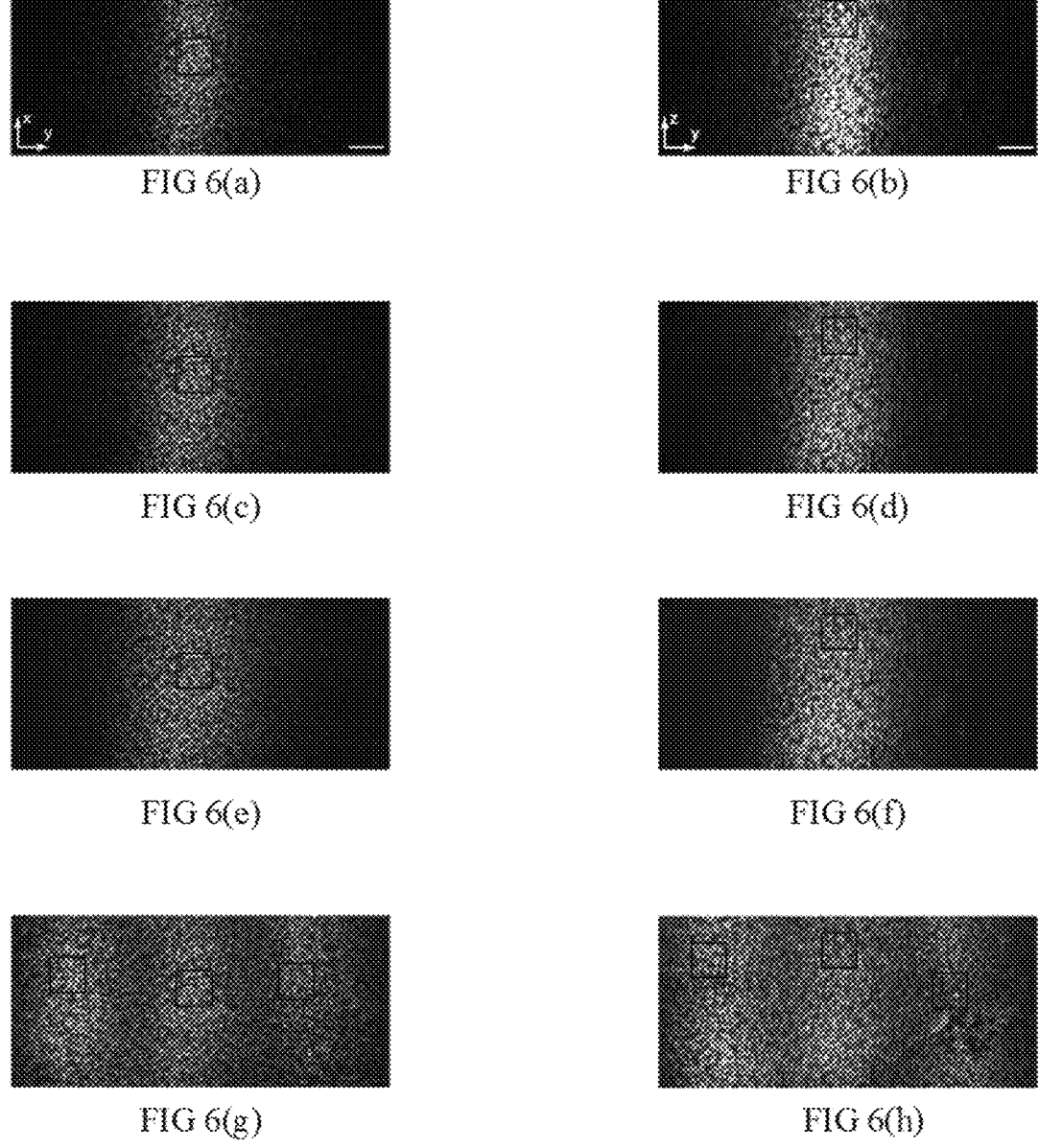
FIGS. 6(a) and 6(b) respectively show the maximum intensity projections in the XY and YZ planes of a volume sample imaged using a continuous light sheet created by scanning an excitation beam in synchronization with the exposure of a 6 μm wide virtual confocal slit, where the excitation numerical aperture (NA) is set to $NA_{od}$=0.08 and $NA_{id}$=0.03.
FIGS. 6(c) and 6(d) respectively show the maximum intensity projections in the XY plane and the YZ plane of the same volume sample imaged using a double-length Bessel light sheet created by scanning an excitation beam in syn-
Figures 7A, 7B, 7C, 7D, 7E, 7F, 7G, 7H, 7I, 7J:
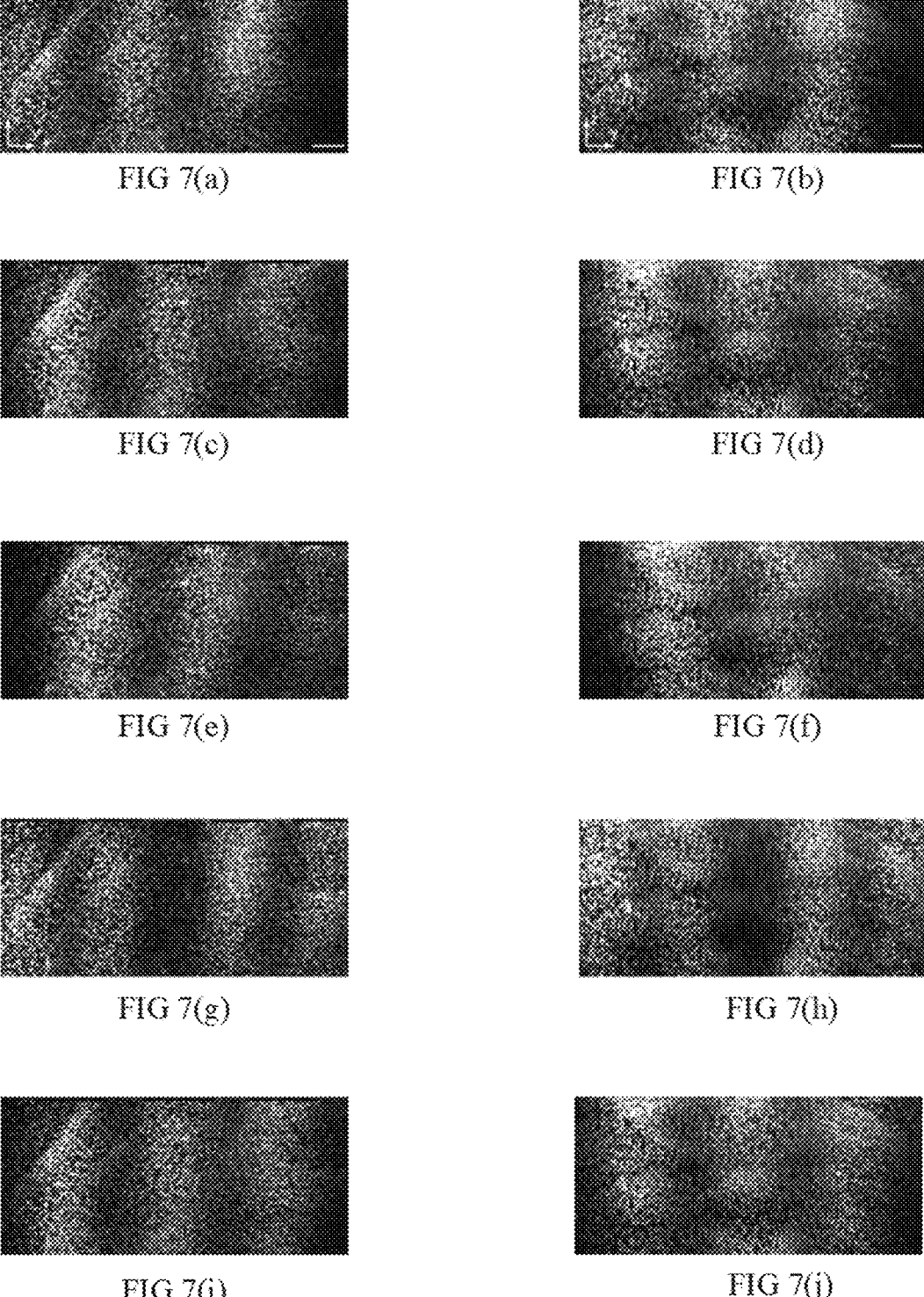
Figure 7K:
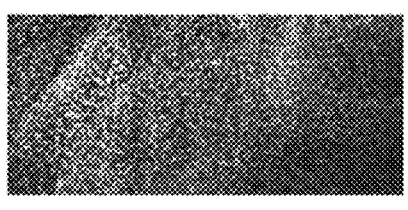
Figure 7L:
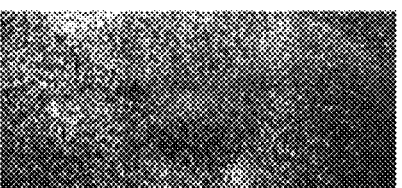

6 chronization with the exposure of a 6 μm wide virtual confocal slit, where the excitation NA is set to $NA_{od}$=0.08 and $NA_{id}$=0.06;

FIGS. 6(e) and 6(f) respectively show the maximum intensity projections in the XY plane and the YZ plane of the same volume sample imaged using a triple-length Bessel light sheet created by scanning an excitation beam in synchronization with the exposure of a 6 μm wide virtual confocal slit, where the excitation NA is set to $NA_{od}$=0.08 and $NA_{id}$=0.067;

FIGS. 6(g) and 6(h) respectively show the maximum intensity projections in the XY and YZ planes of the same volume sample imaged using a discontinuous light sheet created by scanning a three-beam coaxial excitation beam array in synchronization with the exposure of a 6 μm wide virtual confocal slit, where the excitation NA is set to $NA_{od}$=0.08 and $NA_{id}$=0.03;

FIGS. 7(a), 7(c), and 7(e) respectively show the maximum intensity projections in the XY plane of a volume sample imaged using a discontinuous light sheet with three waists created by tiling at three locations according to an embodiment of the present disclosure;

FIGS. 7(b), 7(d), and 7(f) respectively show the maximum intensity projections in the YZ plane of a volume sample imaged using a discontinuous light sheet with three waists created by tiling at three locations according to an embodiment of the present disclosure;

FIGS. 7(g) and 7(i) respectively show the maximum intensity projections in the XY plane of the same volume sample imaged by using a discontinuous light sheet with four waists and a discontinuous light sheet with three waists that are complementary to each other according to an embodiment of the present disclosure;

FIGS. 7(h) and 7(j) respectively show the maximum intensity projections in the YZ plane of the same volume sample imaged by using a discontinuous light sheet with four waists and a discontinuous light sheet with three waists that are complementary to each other according to an embodiment of the present disclosure; and FIGS. 7(k) and 7(l) respectively show the maximum intensity projections in the XY and YZ planes of a reconstruction result that may be obtained with FIGS. 7(a)-7(f) or FIGS. 7(g)-7(j).

DETAILED DESCRIPTION

In order to enable those skilled in the art to better understand the technical solutions of the present disclosure, the present disclosure will be described in detail below in conjunction with the accompanying drawings and specific embodiments. The embodiments of the present disclosure will be described in further detail below in conjunction with the accompanying drawings and specific embodiments, but they are not intended to limit the present disclosure.

"First", "second" and similar words used in the present disclosure do not indicate any order, quantity or importance, but are only used to distinguish different components. "Include" or "comprise" and other similar words mean that an element appearing before this word covers an element listed after this word, but do not exclude other elements. The "Z-axis" direction used in this disclosure indicates the direction of the detection light axis, the "X-axis" direction indicates the extension direction of an excitation light sheet, and the "Y-axis" direction indicates the propagation direction of excitation light.

In addition, although exemplary embodiments have been described herein, the scope thereof includes any and all embodiments based on the present disclosure having equivalent elements, modifications, omissions, combinations (e.g., scenarios where various embodiments intersect), adaptations, or changes. The elements of the claims will be construed broadly based on the language employed in the claims and are not limited to the examples described in this specification or during implementation of this application, the examples of which will be construed as non-exclusive. Accordingly, this specification and the examples are intended to be considered as examples only and the true scope and spirit are indicated by the full scope of the following claims and their equivalents.

FIG. 1(a) shows a schematic diagram of 3D imaging using a discontinuous light sheet in a TLS-SPIM according to an embodiment of the present disclosure. As shown in FIG. 1(a), instead of using a light sheet 1001 with a continuous intensity distribution (i. e., with a single waist 1003), a discontinuous light sheet 1002 with at least two waists 1003 extending in the propagation direction of excitation light (i.e., the Y-axis direction) is used and the discontinuous light sheets 1002 are tiled in the propagation direction of the excitation light for 3D imaging. In this way, it is possible to significantly increase the effective region imaged at each tile, and since the discontinuous light sheet has multiple waists with better beam confinement ability, it is also possible to improve the spatial resolution and optical sectioning ability at each tile. By constructing the discontinuous light sheets in this way, it is possible to increase the size of the individual discontinuous light sheets without degrading the confinement ability of the excitation light like a "non-diffractive" light sheet, thereby taking into account the imaged effective region and optical sectioning capability (spatial resolution in the Z axis) at each tile; further, benefiting from the increase in the effective region imaged at each tile, for samples with the same volume, it is possible to significantly reduce the number of tiles and the corresponding number of exposures of a camera, thus significantly increase the imaging speed and reduce the amount of source image data, and in turn reduce the computational burden caused by the acquisition and analysis of data by an imaging system.

In some embodiments, multiple tiling methods can be used. For example, the same discontinuous light sheet 1004 may be tiled at multiple positions in the propagation direction of the excitation light (as shown in FIG. 1(b)). For another example, multiple discontinuous light sheets 1004 and 1005 that are different and complementary to each other can also be tiled (as shown in FIG. 1(c)). By tiling the multiple discontinuous light sheets 1004 and 1005 that are different and complementary to each other, it is possible to increase the flexibility of tiling for specific imaging demand. Specifically, in the case where the extension size in the Y direction of the volume sample intended to be imaged is exactly the extension size in the Y direction of the discontinuous light sheets 1004 shown in FIGS. 1(b) and 1(c), an ineffective imaging region is generated according to the tiling method of FIG. 1(b), and the tiling distance is the distance between the centers of the adjacent waists of the discontinuous light sheets; but according to the tiling method of FIG. 1(c), it is possible to avoid the creation of the ineffective imaging region as much as possible, reduce the amount of source image data (especially the amount of invalid source image data) and significantly reduce the tiling distance; in the case of alignment of the complementary discontinuous light sheets 1005 and 1004, tiling is not even required, thus further increasing the imaging speed.

In some embodiments, at least one of the discontinuous light sheets to be tiled has adjacent waists whose centers are spaced from each other by an interval above a threshold in the propagation direction of the excitation light, so as to avoid interference between excitation beam arrays corresponding to the adjacent waists and thus improve the spatial resolution. The threshold may be associated with the size of the discontinuous light sheet, and a light sheet with a large size can have great divergence, and it is possible to avoid interference more efficiently by setting a larger threshold.

FIG. 1(d) shows a flowchart of a use method of a TLS-SPIM according to an embodiment of the present disclosure. As shown in FIG. 1(d), the use method comprises: step 101: loading a corresponding phase map to each group of pupil subsections of a pupil by means of a spatial light modulator (SLM) and performing phase modulation on the excitation beam to create at least two coaxial excitation beam arrays. At step 102, the created at least two coaxial excitation beam arrays may be scanned to generate discontinuous light sheets accordingly. By scanning the at least two coaxial excitation beam arrays, the generated discontinuous light sheet may have at least two waists, thereby significantly increasing the effective region imaged at each tile, significantly reducing the number of tiles, and thus reducing the amount of source image data in proportion to the number of the waists. Moreover, the creation of the at least two coaxial excitation beam arrays at the step 101 may be achieved with the SLM in the existing TLS-SPIM, and it is only required to modify the phase map loaded on it (or especially its loading manner), such that the use method has good compatibility with the existing TLS-SPIM, and has low cost and promotion difficulty. Through the special phase map loading manner of the SLM, that is, segmentation of the pupil by means of simulation and the loading of the corresponding phase map to each group of pupil subsections obtained by segmenting the pupil, it is possible to rapidly create the at least two coaxial excitation beam arrays for scanning. Next, at step 103, at least one of the generated discontinuous light sheets may be tiled in the propagation direction of the excitation light, so as to obtain tiling light sheets for selective plane illumination of a sample. Note, besides the sequence of step 101, step 102 and step 103 shown in FIG. 1(d), it should be noted that the execution sequence of these steps is not limited to this, and any other order of execution is possible, as long as it does not logically affect the execution of the individual steps.

In the present disclosure, the SLM equipped in a typical TLS microscopy is used to generate the coaxial excitation beam array, which enables the TLS microscopy to use the coaxial excitation beam arrays with different intensity distributions, beam numbers and periods, and to quickly tile the excitation beam arrays and switch between different beam arrays, thereby optimizing the imaging ability of the TLS-SPIM with the discontinuous light sheets in different applications.

In some embodiments, the pupil may be the entrance pupil of an excitation objective. Correspondingly, the optical modulation plane of the SLM may be configured to be conjugated to the entrance pupil of the excitation objective. In this way, the creation of the at least two coaxial excitation beam arrays may be completed by realizing the segmentation of each group of pupil subsections by means of the simulation in advance, obtaining, by simulation in advance, a combined phase map needed for loading the corresponding phase map to each group of pupil subsections of the pupil, loading the combined phase map to the SLM, and performing phase modulation on the excitation beam.

The steps of creating and tiling the two coaxial excitation beam arrays shown in FIGS. 2(a)-2(d) are described below. As an example, a binary SLM may be used, the phase maps loaded to the binary SLM are binary phase maps obtained by binarizing the corresponding continuous phase maps, and the binary SLM is beneficial to further increasing the processing speed. Correspondingly, by loading the corresponding phase maps (for example, the first phase map 201 shown in FIG. 2(a) and the second phase map 202 shown in FIG. 2(b)) to the binary SLM, pairs of coaxial excitation beams are created as a first coaxial excitation beam array 203 and a second coaxial excitation beam array 204. It is just an example but not limitation, and it is also possible to use a continuous SLM instead of the binary SLM. Each of the first coaxial excitation beam array and the second coaxial excitation beam array created by loading the corresponding phase maps has only a single coaxial excitation beam. As an example, the excitation numerical aperture (NA) is set to $NA_{od}=0.08$ and $NA_{id}=0.03$.

FIG. 2(a) shows a diagram of a first group of pupil subsections 205 and the first phase map 201 for generating a first pair of coaxial excitation beams (also collectively referred to as the first coaxial excitation beam array) 203, and the first pair of coaxial excitation beams 203 according to an embodiment of the present disclosure. FIG. 2(b) shows a diagram of a second group of pupil subsections 206 and the second phase map 202 for generating a second pair of coaxial excitation beams (also collectively referred to as the second coaxial excitation beam array) 204, and the second pair of coaxial excitation beams 204 according to an embodiment of the present disclosure.

As shown in FIGS. 2(a) and 2(b), the groups of pupil subsections 205 and 206 are obtained by segmenting the pupil (shown as a circle as an example), and each group of pupil subsections 205 (or 206) includes a subsection 2051 (or 2061, identified in white) loaded with a valid pattern of the phase map and a subsection 2052 (or 2062, labeled in black) not loaded with the valid pattern of the phase map. By loading the corresponding phase maps 201 and 202 to the groups of pupil subsections 205 and 206, it is possible to create the coaxial excitation beam arrays 203 and 204 similar to those created by loading corresponding phase maps to a complete pupil; by segmentation of the groups of pupil subsections 205 and 206 and loading different phase maps to each group, at least two coaxial excitation beam arrays 203 and 204 can be created with a single pupil, thereby increasing the imaging region achieved by a single tile and reducing the number of imaging times and imaging time.

In some embodiments, the subsections 2051 and 2061 loaded with the valid patterns of the phase maps may not overlap between the different groups of pupil subsections 205 and 206, which may reduce the interference between the created coaxial excitation beam arrays 203 and 204, and is beneficial to making the coaxial excitation beam arrays 203 and 204 staggered with each other, thereby expanding the overall imaging region realized by the coaxial excitation beam arrays 203 and 204 and improving the overall utilization efficiency of the coaxial excitation beam arrays 203 and 204.

In some embodiments, the pupil subsections 2051, 2052, 2062 and 2061 may be in a radially extending structure, and the subsections 2051 (or 2061) in each group of pupil subsections 205 (or 206) loaded with the valid patterns of the phase map 201 (or 202) may be evenly distributed circumferentially. In this way, light-transmitting portions may be more evenly distributed, and a light transmission condition may be closer to that of a complete circular pupil, thus making it easier to perform pupil segmentation. The created coaxial excitation beam arrays 203 and 204 and the light sheet obtained accordingly by scanning the same are also closer to the relatively ideal coaxial excitation beam arrays and light sheet created with the complete circular pupil.

In some embodiments, it is possible to control the intensity distribution and position of each excitation beam individually by adjusting the area of each of the pupil subsections 2051, 2052, 2062 and 2061 and the corresponding loaded phase maps 201 and 202. Specifically, the light intensity of the corresponding coaxial excitation beam can be increased by increasing the area of the subsection 2051 (or 2061, also referred to as a light-transmitting subsection) loaded with the valid pattern of the phase map 201 (or 202), and vice versa. Further, by changing the valid pattern of the phase map 201 (or 202) to be loaded to respective pupil subsections 2051 (or 2061), the positions of the respective excitation beams can also be changed individually. That is, by adjusting the segmentation of the pupil subsections 2051, 2052, 2062 and 2061 and changing the corresponding loaded phase map 201 (or 202) in a simulated manner, it is possible to calibrate the light intensity and positional deviations between the created individual coaxial excitation beams, and to precisely control the intensity distributions and positions of the individual excitation light beams of each coaxial excitation beam.

In some embodiments, as shown in FIGS. 2(*a*) and 2(*b*), each coaxial excitation beam array 203 (or 204) may include a pair of coaxial excitation beams spaced apart in the propagation direction of the excitation light. By loading the corresponding phase map 201 (or 202) to each group of pupil subsections 205 (or 206) of the pupil, each pair of coaxial excitation beams in each coaxial excitation beam array 203 (or 204) may be staggered with each other. In this way, a final coaxial excitation beam array 207 obtained by combining the coaxial excitation beam arrays 203 and 204 can be shown in FIG. 2(*c*), the size in the propagation direction of the excitation light is increased significantly, and the spatial resolution in the direction of the detection optical axis (Z) is taken into account.

By loading a combined phase map 208 on the SLM, the final coaxial excitation beam array 207 including both the first and second pairs of coaxial excitation beams 203 and 204 can be created together, as shown in FIG. 2(*c*), and the combined phase map 208 can be determined by simulation in advance.

In some embodiments, both the creating of the final coaxial excitation beam array 207 and tiling the discontinuous light sheet 210 in the propagation direction of the excitation light are achieved by superimposing a spherical phase on the combined phase map 208 shown in FIG. 2(*c*) and loading the processed phase map 209 to the SLM, as shown in FIG. 2(*d*).

The intensity distribution of the discontinuous light sheet created by scanning the at least two coaxial excitation beam arrays according to the embodiment of the present disclosure and the intensity distribution of a Bessel light sheet created by scanning Bessel beams will be compared below by referring to FIGS. 3(*a*) and 3(*b*). FIG. 3(*a*) shows the maximum intensity projection in the YZ plane of the discontinuous light sheet created by scanning the coaxial excitation beam array shown in FIG. 2(*c*), and its intensity distribution at a designated position according to an embodiment of the present disclosure. FIG. 3(*b*) shows the maximum intensity projection in the YZ plane of a Bessel light sheet with a thickness and effective length equivalent to those of the discontinuous light sheet shown in FIG. 3(*a*), and its intensity distribution at a designated position.

As shown in FIGS. 3(*a*) and 3(*b*), the discontinuous light sheet created according to the embodiments of the present disclosure is significantly improved compared to the Bessel light sheet in the maximum intensity projection in the YZ plane and intensity distribution.

In some embodiments, the scanning of the coaxial excitation beam array may be synchronized with the exposure of a virtual confocal slit on a detection camera. FIG. 3(*c*) shows the maximum intensity projection in the YZ plane of an equivalent light sheet obtained by scanning the coaxial excitation beam array shown in FIG. 2(*c*) in synchronization with the exposure of a 7.5 μm wide virtual confocal slit, and its intensity distribution at a designated position using a virtual confocal slit with a different width according to an embodiment of the present disclosure. The crosstalk between different beams of the coaxial excitation beam array increases the off-focus excitation light intensity when the excitation beam array is scanned to create the discontinuous light sheet. The off-focus light of the excitation beam array accumulates during the scanning process and results in strong off-focus excitation at the waist positions of the obtained discontinuous light sheet, as shown in FIG. 3(*a*) (see the sidelobe distribution on either side of the central location of its intensity distribution). By comparing the intensity projections and intensity distributions shown in FIGS. 3(*c*) and 3(*a*), it is verified that by performing the scanning in synchronization with the exposure of the virtual confocal slit by the detection camera, it is possible to filter out the off-focus excitation beams and discard most of the fluorescent background created by the off-focus excitation light.

To be precise, regardless of the intensity distribution, diffraction of light dominates the trade-off among the thickness, light confinement ability and size of a light sheet, and the light confinement ability of a light sheet always decreases as its useful portion increases. Fortunately, the off-focus excitation of discontinuous light sheets created by scanning coaxial excitation beam arrays can be suppressed by using a detection camera (such as, but not limited to, a sCMOS camera) and operating it in a light sheet readout mode. In this operation mode, a virtual confocal slit with an adjustable width may be achieved by changing the number of pixel rows with the exposure and readout synchronized with the scanning, resulting in detection effect equivalent to slit confocal detection effect. As a result, most of the fluorescent background created by the off-focus excitation light is discarded by the camera, which further improvs the optical sectioning ability of the discontinuous light sheet.

In both FIGS. 3(*c*) and 3(*d*), the beam is scanned synchronously with the exposure of the 7.5 μm wide virtual confocal slit to generate the corresponding light sheet. It can be seen from the comparison that, for the discontinuous light sheet obtained by synchronously scanning the coaxial excitation beam array in accordance with the embodiment of the present disclosure in this manner, compared with a Bessel light sheet (which is a type of "non-diffracting" light sheet) obtained by scanning a Bessel beam synchronously, the off-focus excitation beam can be filtered out more effectively and the off-focus background can be discarded more effectively.

Figure 3C:
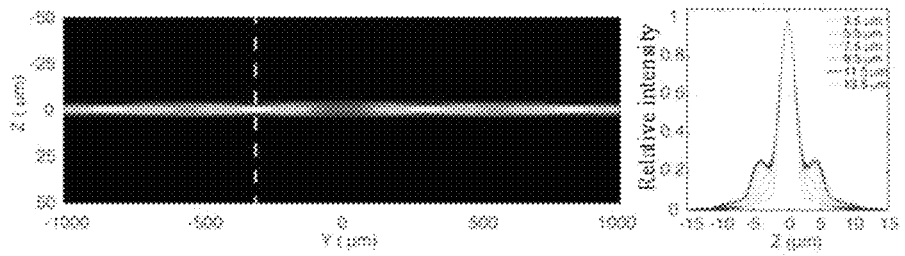
FIG. 3(c) shows the maximum intensity projection in the YZ plane of an equivalent light sheet obtained by scanning the coaxial excitation beam array shown in FIG. 2(c) in synchronization with the exposure of a 7.5 μm wide virtual confocal slit, and its intensity distribution at a designated position using a virtual confocal slit with a different width according to an embodiment of the present disclosure.
Figure 3D:
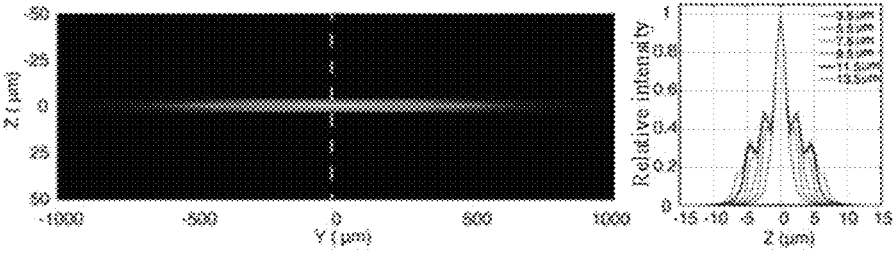
FIG. 3(d) shows the maximum intensity projection in the YZ plane of an equivalent light sheet obtained by scanning a Bessel beam used in FIG. 3(b) in synchronization with the exposure of a 7.5 μm wide virtual confocal slit, and its intensity distribution at a designated position using a virtual confocal slit with a different width.

Although the usable parts of the discontinuous light sheet and the Bessel light sheet respectively shown in FIGS. 3(*a*) and 3(*b*) are both expanded by degrading the light confinement ability, there is a significant difference in the distribution of the unconstrained off-focus excitation beam. The discontinuous light sheet causes the off-focus excitation beam to be distributed much further from the detection focal plane compared with the Bessel light sheet, so that the off-focus excitation beam can be more effectively filtered out by the virtual confocal slit, as shown in FIGS. 3(c) and 3(d).

In some embodiments, the virtual confocal slit is adjustable in width. By adjusting it to a smaller width which is equivalent to the thickness of the scanned excitation beam, it is possible to more effectively discard the off-focus background (see the intensity distributions corresponding to the different slit widths on the right sides of FIGS. 3(c) and 3(d)).

In general, the simulation result shows that the discontinuous light sheet with multiple waists obtained by scanning in the TLS-SPIM synchronously with the exposure of the virtual confocal slit of the sCMOS camera can work more efficiently. The use of the discontinuous light sheets at each tile enables imaging of a larger effective region, which increases the imaging speed, reduces the amount of source image data, and significantly improves the optical sectioning ability of the light sheets and the spatial resolution in imaging.

Figure 4A:
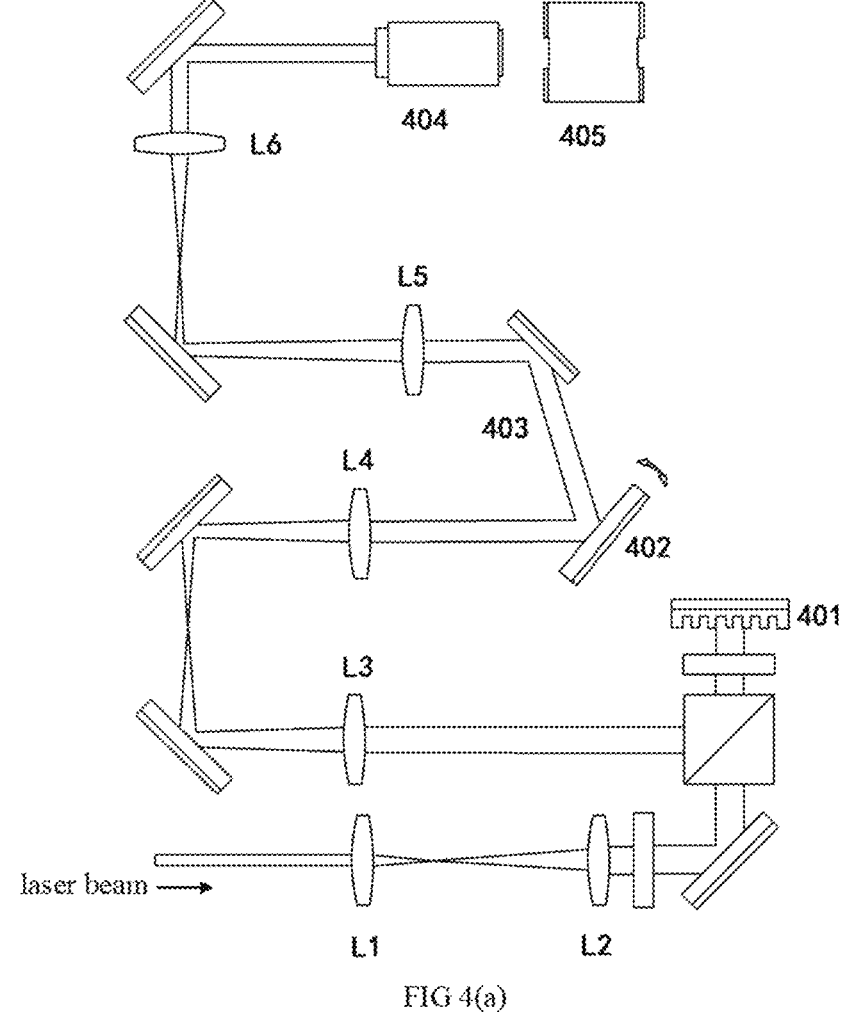
FIG. 4(a) shows an outline view of a TLS-SPIM according to an embodiment of the present disclosure.

FIG. 4(a) shows an outline view of a TLS-SPIM according to an embodiment of the present disclosure. As shown in FIG. 4(a), the TLS-SPIM comprises a SLM 401 for performing phase modulation on an excitation beam, a galvanometer 402, an illumination path 403, and an excitation objective 404 at an end of the illumination path 403, and an optical modulation plane of the SLM 401 may be set to be conjugated to the entrance pupil of the excitation objective 404 and is configured to modulate illumination light; the galvanometer 402 may be configured to scan the excitation beam (array) to generate a corresponding light sheet. The TLS-SPIM 400 may adopt the existing hardware configuration of a conventional TLS-SPIM (including the above-mentioned components and a detection camera 405), only with change in the way of loading a phase map to the SLM 401, such that a novel TLS-SPIM that significantly increases the imaging speed, improves the resolution and reduces the amount of source data can be obtained with a convenient and low-cost modification to the software of a conventional TLS-SPIM. Specifically, the SLM may be configured to load a combined phase map obtained by simulation in advance to implement loading of the corresponding phase map to each group of pupil subsections of the pupil, so as to create multiple coaxial excitation beam arrays, as shown in FIG. 2(c). Accordingly, the galvanometer 402 scans at least one of the created coaxial excitation beam arrays to generate at least one discontinuous light sheet accordingly. The SLM 401 may further be configured to load a combined phase map superimposed with a spherical phase, so as to implement the creation of the coaxial excitation beam arrays together with tiling of the discontinuous light sheet in the propagation direction of the excitation light, as shown in FIG. 2(d).

In some embodiments, the galvanometer 402 may further be configured to scan the at least one created coaxial excitation beam array synchronously based on the exposure timing of a virtual confocal slit on the detection camera. Further, the scanning may be performed synchronously based on the timing of the exposure and readout of different numbers of pixel rows to achieve a virtual confocal slit with an adjustable width.

FIG. 4(b) shows a schematic structural diagram of an example of a TLS-SPIM according to an embodiment of the present disclosure. As shown in FIG. 4(b), for example, an excitation laser beam with a wavelength of 488 nm is expanded to a beam diameter of about 8 mm (the focal length of lens L1 is 30 mm and the focal length of lens L2 is 250-mm), and is sent to a binary SLM assembly 401 for phase modulation. The binary SLM assembly 401 may consist of a polarization splitter prism, a half-wave plate and a 1280×1024 binary SLM. The modulated light is focused on an optical slit to block the undesired diffraction orders generated by the SLM, and the SLM is conjugated to a galvanometer 402 through relay lenses (for example, lens L3 with a focal length of 300 mm and lens L4 with a focal length of 175 mm). The galvanometer 402 may be offset by an initial angle to direct illumination light to one of two symmetrical illumination paths 403 and 406 and create a virtual excitation light sheet for sample illumination by scanning the coaxial excitation beam array. The modulated laser beam is further conjugated to the entrance pupils of two excitation objectives 404 and 407 through two pairs of relay lenses (for example, paired lens L5 and lens L6 with a focal length of 150 mm, and paired lens L7 and lens L8 with a focal length of 250 mm) to illuminate a sample from two opposite directions. In some embodiments, two Mitutoyo MY5X-802 objectives may be used as the excitation objectives 404 and 407 of the microscopy. A detection camera 405 may adopt various configurations. For example, emitted fluorescence can be collected with an Olympus MVX10 Macro Zoom microscopy equipped with a 0.25 NA long working distance detection objective, and imaged onto a sCMOS camera (for example, Hamamatsu, Orca Flash 4.0 v3). The sample is mounted on a sample holder to be immersed in an imaging buffer, and the sample holder is driven by a 3D translational stage for 3D imaging.

With the TLS-SPIM as shown in FIG. 4(b), the 3D imaging ability achieved using the discontinuous light sheet according to the present disclosure is verified.

In some embodiments, improvements on the software of the existing TLS-SPIM can be implemented in a microscopy system including the above-mentioned TLS-SPIM and a processing unit (not shown). The processing unit may be configured to: perform simulation at first to obtain a combined phase map, the loading of which to a SLM implements loading of a corresponding phase map to each group of pupil subsections of a pupil, so as to create multiple coaxial excitation beam arrays; and superimpose a spherical phase on the combined phase map according to a need for tiling of at least one generated discontinuous light sheet.

In some embodiments, the need for tiling may comprise: tiling the same discontinuous light sheet at multiple positions in the propagation direction of the excitation light; and/or tiling multiple discontinuous light sheets which are different but complementary to each other.

Specifically, the processing unit may be included in or in communication with the TLS-SPIM. As an example, the processing unit may include a computer workstation, and a PCIe-6323 DAQ card, and a BNC 2090A connector block from National Instruments. The processing unit may obtain input parameters from the control software developed by Labview, and generate corresponding synchronization control signals to control various mechanical and optoelectronic devices of the tiling light sheet microscopy according to the various embodiments of the present disclosure, thus realizing the various steps of the use method according to the various embodiments of the present disclosure.

In some embodiments, the processing unit can be configured to perform various kinds of simulation, and load the phase map obtained by the simulation to the SLM to realize the geometric shape, the number of tiles and the tiling position of the excitation light sheet.

In some embodiments, the processing unit can be configured to segment the pupil to obtain multiple groups of pupil subsections, such that each group of pupil subsections comprises a subsection loaded with a valid pattern of the phase map and a subsection not loaded with the valid pattern of the phase map.

In some embodiments, the processing unit can be further configured to segment the pupil, so that: the subsections loaded with the valid patterns of the phase maps do not overlap among different groups of pupil subsections; and/or the pupil subsections are radial subsections, and the subsections loaded with the valid patterns of the phase map in each group of pupil subsections are evenly distributed circumferentially; and/or the area of each pupil subsection and the corresponding loaded phase map are adjusted to individually control the intensity distribution and position of each excitation beam in the coaxial beam array.

In some embodiments, the processing unit can be further configured to: perform simulation at first to obtain the combined phase map, such that each coaxial excitation beam array created by loading the combined phase map to the SLM comprises a pair of coaxial excitation beams which are spaced apart in the propagation direction of the excitation light, and each pair of coaxial excitation beams in each coaxial excitation beam array are staggered with each other.

It is possible to evaluate the imaging performance of the TLS-SPIM (whose structure is as shown in FIG. 4(b)) with the discontinuous light sheets according to the embodiment of the present disclosure by imaging a fixed mouse brain having green fluorescent protein transfected in microglia cells and optically cleared using a CUBIC2 solution. What is first examined is the imaging ability of the discontinuous light sheets generated by scanning the coaxial excitation beam arrays with different beam thicknesses, beam numbers and beam array periods.

Figures 5C, 5D, 5E, 5F, 5G, 5H, 5I, 5J:
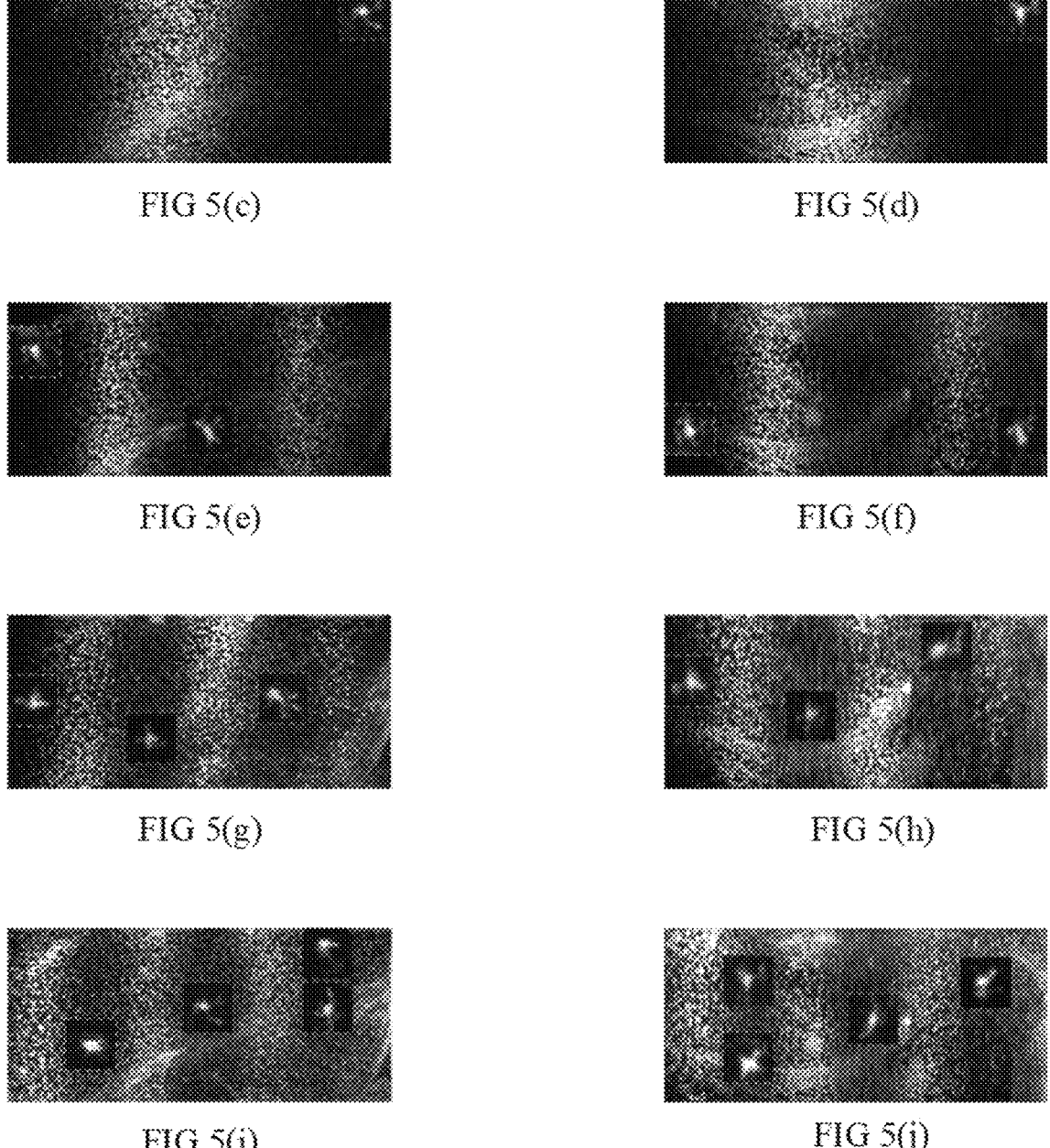
FIGS. 5(c) and 5(d) respectively show the maximum intensity projections in the XY and YZ planes of the same volume sample imaged using a light sheet created by scanning the excitation beam used in FIGS. 5(a) and 5(b) in synchronization with the exposure of a 6 μm wide virtual confocal slit.
FIGS. 5(e) and 5(f) respectively show the maximum intensity projections in the XY and YZ planes of the same volume sample imaged using a discontinuous light sheet created by scanning a two-beam coaxial excitation beam array in synchronization with the exposure of a 6 μm wide virtual confocal slit according to an embodiment of the present disclosure.
FIGS. 5(g) and 5(h) respectively show the maximum intensity projections in the XY and YZ planes of the same volume sample imaged using a discontinuous light sheet created by scanning a three-beam coaxial excitation beam array in synchronization with the exposure of a 6 μm wide virtual confocal slit according to an embodiment of the present disclosure.
FIGS. 5(i) and 5(j) respectively show the maximum intensity projections in the XY and YZ planes of the same volume sample imaged using a discontinuous light sheet created by scanning a four-beam coaxial excitation beam array in synchronization with the exposure of a 6 μm wide virtual confocal slit according to an embodiment of the present disclosure.

As shown in FIGS. 5(a)-5(d), the discontinuous light sheet created by scanning the excitation beam used in FIGS. 5(a) and 5(b) in synchronization with the exposure of a 6 μm wide virtual confocal slit improves the 3D imaging ability of the microscopy. As an example, the excitation NA is set to $NA_{od}=0.045$ and $NA_{id}=0.015$.

As shown in FIGS. 5(e)-5(j), by scanning a multi-beam (for example, two-beam, three-beam and four-beam) coaxial excitation beam array in synchronization with the exposure of a 6 μm wide virtual confocal slit according to an embodiment of the present disclosure, not only the 3D imaging ability of the microscopy is improved due to this synchronized scanning, but also the good spatial resolution and optical sectioning ability are maintained at the waists of all the discontinuous light sheets. As shown in FIGS. 5(c)-5(d) and 5(i)-5(j), by using thinner discontinuous light sheets, the spatial resolution can be improved as the effective imaging region increases. As an example, for all the discontinuous light sheets, the excitation NA is set to $NA_{od}=0.08$ and $NA_{id}=0.03$.

In the present disclosure, the imaging ability of the discontinuous light sheet according to the embodiments of the present disclosure and a Bessel light sheet with similar effective lengths is compared. As shown in FIGS. 6(a)-6(f), despite the use of a 6 μm wide virtual confocal slit, the spatial resolution of images obtained using the Bessel light sheet decreases significantly as the light sheet length increases, because the off-focus excitation of the Bessel light sheet stays too close to the detection focal plane to be removed by the confocal slit effectively. On the contrary, the same spatial resolution and optical sectioning ability are maintained within a larger region at the light sheet waist positions by using the discontinuous light sheet according to the embodiments of the present disclosure (see FIGS. 6(g)-6(h)).

In the present disclosure, a sample with a volume of about 4 mm³ is imaged by using tiled discontinuous light sheets obtained according to some embodiments.

Firstly, the volume sample is imaged in about 1 minute at spatial resolution of about 2×2×4 μm³ by tiling a discontinuous light sheet containing three waists at three positions, as shown in FIGS. 7(a)-7(f). The imaging speed is improved, and the amount of source data is decreased by 3 times compared to a conventional continuous light sheet for which 9 tiles are required for the same performance. Next, the same volume sample is imaged by using a discontinuous light sheet containing four waists and a compensating discontinuous light sheet containing three waists, and a discontinuous light sheet formed by combining the two discontinuous light sheets is slightly longer and thicker than the four-waist discontinuous light sheet, as shown in FIGS. 7(g)-7(j). The same image volume is imaged at roughly the same spatial resolution in about 40 seconds, and only two tiles are required to image the entire FOV, which represents a 3.5-time improvement of the imaging efficiency, which would require 7 tiles for a continuous tiling light sheet. A final result is reconstructed by selecting and stitching the regions corresponding to the light sheet waist positions in all tiles (see FIGS. 7(k) and 7(l)). As shown, the TLS-SPIM may works much more efficiently with the same imaging performance by using the discontinuously light sheets.

The above description is intended to be illustrative and not limiting. For example, the above-mentioned examples (or one or more solutions thereof) may be used in combination with each other. For example, those of ordinary skill in the art may use other embodiments when reading the above-mentioned description. In addition, in the above-mentioned specific embodiments, various features may be grouped together to simplify the present disclosure. This should not be interpreted as an intention that features of the disclosure that do not require protection are necessary for any of the claims. Rather, the subject matter of the present disclosure may be less than the full range of features of a particular disclosed embodiment. Therefore, the following claims are incorporated herein as examples or embodiments in the particular embodiment, each claim stands alone as a separate embodiment, and it is contemplated that these embodiments may be combined with each other in various combinations or permutations. The scope of the present invention shall be determined by reference to the full scope of the appended claims and equivalent forms to which these claims are entitled.

The above embodiments are only exemplary embodiments of the present disclosure, and are not used to limit the present invention. The scope of protection of the invention is defined by the claims. Those skilled in the art can make various modifications or equivalent substitutions to the invention within the essence and protection scope of the disclosure, and such modifications or equivalent substitutions should also be regarded as falling within the protection scope of the invention.

What is claimed is:

1. A method of using a tiling light sheet selective plane illumination microscope, comprising:

segmenting a single pupil to obtain at least two groups of pupil subsections of the single pupil, so that each group of pupil subsections comprises subsections loaded with a valid pattern of a phase map and subsections not loaded with the valid pattern of the phase map, which are alternately distributed in a circumferential direction, wherein the subsections loaded with the valid patterns of the phase maps do not overlap among different groups of pupil subsections, wherein the pupil subsections are radial subsections, and the subsections loaded with the valid patterns of the phase map in each group of pupil subsections are evenly distributed circumferentially;

loading a corresponding phase map to each group of pupil subsections of the single pupil respectively by a spatial light modulator (SLM), and performing phase modulation on an excitation beam to create at least two coaxial excitation beam arrays with the single pupil;

scanning the created at least two coaxial excitation beam arrays to generate discontinuous light sheets accordingly; and tiling at least one of the generated discontinuous light sheets in a propagation direction of an excitation light to obtain tiling light sheets for selective plane illumination of a sample.

2. The method of claim 1, wherein the pupil is an entrance pupil of an excitation objective.

3. The method of claim 1, wherein the loading a corresponding phase map to each group of pupil subsections of a pupil by a spatial light modulator (SLM) is achieved by loading a combined phase map to the SLM, and the combined phase map is determined by simulation in advance.

4. The method of claim 3, wherein both the creating coaxial excitation beam arrays and tiling the discontinuous light sheets in the propagation direction of the excitation light are achieved by superimposing a spherical phase on the combined phase map and loading the processed phase map to the SLM.

5. The method of claim 1, wherein the tiling at least one of the generated discontinuous light sheets in the propagation direction of the excitation light includes tiling the same discontinuous light sheet at multiple positions in the propagation direction of the excitation light.

6. The method of claim 5, wherein the tiling at least one of the generated discontinuous light sheets in the propagation direction of the excitation light includes tiling multiple discontinuous light sheets which are different and complementary to each other.

7. The method of claim 1, further comprising: individually controlling an intensity distribution and position of each coaxial beam array by adjusting an area of each pupil subsection and corresponding loaded phase map.

8. The method of claim 1, wherein each coaxial excitation beam array comprises a pair of coaxial excitation beams which are spaced apart in the propagation direction of the excitation light, and each pair of coaxial excitation beams in each coaxial excitation beam array are staggered with each other by loading the corresponding phase map to each group of pupil subsections of the pupil.

9. The method of claim 1, wherein the SLM is a binary SLM, the phase maps loaded to the SLM are binary phase maps, and the binary phase maps are obtained by binarizing the corresponding continuous phase maps.

10. The method of claim 1, wherein at least one of the discontinuous light sheets to be tiled has adjacent waists whose centers are spaced from each other by an interval above a threshold in the propagation direction of the excitation light, in which the threshold is associated with a size of the discontinuous light sheet.

11. The method of claim 1, wherein the scanning of the at least one created coaxial excitation beam array is synchronized with an exposure of a virtual confocal slit on a detection camera.

12. The method of claim 11, wherein the virtual confocal slit with an adjustable width is achieved by changing a number of pixel rows with an exposure and readout synchronized with the scanning.

13. A tiling light sheet selective plane illumination microscope, comprising:

a spatial light modulator (SLM) for performing phase modulation on an excitation beam, a galvanometer, an illumination path and an excitation objective at an end of the illumination path, and an optical modulation plane of the SLM is conjugated to the entrance pupil of the excitation objective, wherein the SLM is configured to load a combined phase map obtained by simulation in advance to implement loading of a corresponding phase map to each group of pupil subsections of a single pupil respectively, so as to create multiple coaxial excitation beam arrays, wherein the pupil subsections are at least two groups and obtained by segmenting the single pupil, so that each group of pupil subsections comprises subsections loaded with a valid pattern of a phase map and subsections not loaded with the valid pattern of the phase map, wherein the subsections loaded with the valid patterns of the phase maps do not overlap among different groups of pupil subsections, wherein the pupil subsections are radial subsections, and the subsections loaded with the valid patterns of the phase map in each group of pupil subsections are evenly distributed circumferentially, wherein the galvanometer is configured to scan the at least one created coaxial excitation beam array to generate at least one discontinuous light sheet accordingly, wherein the SLM is further configured to load a combined phase map superimposed with a spherical phase, so as to implement creation of the coaxial excitation beam arrays together with tiling of the discontinuous light sheets in a propagation direction of the excitation light.

14. The tiling light sheet selective plane illumination microscope of claim 13, wherein the pupil is the entrance pupil of the excitation objective.

15. The tiling light sheet selective plane illumination microscope of claim 14, wherein the galvanometer is further configured to scan the at least one created coaxial excitation beam array synchronously based on exposure timing of a virtual confocal slit by a detection camera.

16. A tiling light sheet selective plane illumination microscope system, comprising:

the tiling light sheet selective plane illumination microscope of claim 13; and a processing unit configured to perform simulation at first to obtain the combined phase map, the loading of which to the SLM implements the loading of the corresponding phase map to each group of pupil subsections of the single pupil respectively, so as to create the multiple coaxial excitation beam arrays; and superimpose the spherical phase on the combined phase map according to a need for tiling of the at least one generated discontinuous light sheet.

17. The microscope system of claim 16, wherein the need for tiling comprises:

tiling the same discontinuous light sheet at multiple positions in the propagation direction of the excitation light; and/or tiling multiple discontinuous light sheets which are different and complementary to each other.

18. The microscope system of claim 16, wherein the processing unit is further configured to segment the pupil, such that:

the area of each pupil subsection and the corresponding loaded phase map are adjusted, so as to individually control intensity distribution and position of each excitation beam in the coaxial beam array.

19. The microscope system of claim 16, wherein the processing unit is further configured to perform simulation at first to obtain the combined phase map, such that each coaxial excitation beam array created by loading the combined phase map to the SLM comprises a pair of coaxial excitation beams which are spaced apart in the propagation direction of the excitation light, and each pair of coaxial excitation beams in each coaxial excitation beam array are staggered with each other.

\* \* \* \* \*